United States Patent
Seto et al.

(10) Patent No.: US 7,050,468 B2
(45) Date of Patent: May 23, 2006

(54) MULTIPLEXED SIGNAL TRANSMITTER/RECEIVER, COMMUNICATION SYSTEM, AND MULTIPLEXING TRANSMISSION METHOD

(75) Inventors: Koichiro Seto, Ibaraki (JP); Masaru Kuriyama, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 957 days.

(21) Appl. No.: 09/859,887

(22) Filed: May 18, 2001

(65) Prior Publication Data

US 2002/0021720 A1 Feb. 21, 2002

(30) Foreign Application Priority Data

May 18, 2000 (JP) .............................. 2000-152700

(51) Int. Cl.
*H04J 3/03* (2006.01)
*H04J 3/06* (2006.01)
(52) U.S. Cl. ....................................... 370/535; 370/503
(58) Field of Classification Search ........ 370/535–542, 370/503, 474–476, 522–529; 375/368, 363, 375/366
See application file for complete search history.

(56) References Cited

U.S. PATENT DOCUMENTS 6,160,823 A * 12/2000 Saintot ........................ 370/538

| | | | |
|---|---|---|---|
| 6,323,789 B1 * | 11/2001 | Lawrence | 341/58 |
| 6,625,241 B1 * | 9/2003 | Mejia | 375/372 |
| 6,628,679 B1 * | 9/2003 | Talarek | 370/536 |
| 6,690,682 B1 * | 2/2004 | Giaretta et al. | 370/535 |
| 6,718,139 B1 * | 4/2004 | Finan et al. | 398/59 |

FOREIGN PATENT DOCUMENTS

| JP | 2000115108 A | * | 4/2000 |
|---|---|---|---|
| JP | 2000115109 A | * | 4/2000 |

OTHER PUBLICATIONS

Lawrence, Method of multiplexing several 8b/10b coded input streams onto a single higher rate 8b/10b output stream, Aug. 1999, U.S. Appl. No., 60/149,076, pp. 1-13.*
Woodward et al., "A System For Native Ethernet Optical Transport At 10 Gb/s", *Lucent Technologies*, (2000).

* cited by examiner

*Primary Examiner*—Steven Nguyen
(74) *Attorney, Agent, or Firm*—Foley & Lardner LLP

(57) ABSTRACT

To provide a transmitter/receiver and a method for a multiplexing transmission and reception of transmission signals of Gigabit Ethernet, without needing a great buffer memory, nor processes for adding channel identification numbers to frames or for removal, at a multiplexed signal transmitter in which data signals input from a plurality of channels of Gigabit Ethernet are multiplexed to be transmitted, a particular 10-bit data word is transmitted before transmission of a data input from a particular channel, and at a multiplexed signal receiver, the particular channel is identified by the 10-bit data word to be present or not.

4 Claims, 8 Drawing Sheets

US 7,050,468 B2

MULTIPLEXED SIGNAL TRANSMITTER/RECEIVER, COMMUNICATION SYSTEM, AND MULTIPLEXING TRANSMISSION METHOD

BACKGROUND OF THE INVENTION

1. Field of the Invention

The present invention relates to a Gigabit Ethernet communication system, and apparatuses for transmission and reception of transmission signals of a plurality of channels of Gigabit Ethernet, as well as a multiplexing transmission method therefor.

2. Description of Relevant Art

Gigabit Ethernet (a registered trademark of Xerox Co.) is specified in IEEE Std802.3, 1998, of the IEEE (Institute of Electric and Electronic Engineer) Standards. Conventionally, in cases of transmission data of Gigabit Ethernet to be electrically multiplexed for transmission and reception, there has been employed a method called "frame multiplexing".

As shown in FIG. 1, two apparatuses 01 and 02 for transmission data of Gigabit Ethernet electrically multiplexed to be thereby transmitted and received are respectively constituted with a Gigabit Ethernet multiplexer 20 and a Gigabit Ethernet demultiplexer 30. The apparatuses 01 and 02 are transmitter/receivers identical in constitution. The two transmitter/receivers are connected by a pair of optical fiber cables as transmission means 03 and 04, for bi-directional transmission. Continuous 10 bits of transmission data constitute a 10-bit data, and a plurality of continuous 10-bit data constitute a unit called "frame". In Gigabit Ethernet, transmission data are transmitted and received in the unit of frame. In the case of Gigabit Ethernet, the frame has a length of continued data between 64 bytes to 1518 bytes.

In the multiplexer 20 of a multiplexed signal transmitter/receiver to be used for a multiplexing transmission of 2-channel Gigabit Ethernet, as shown in FIG. 2, arriving frames at respective channels of Gigabit Ethernet are once stored in transmission memories (buffer memories) 22 and 23 of the channels, and the stored frames are sent to a multiplexing transmission processor 21, where they are multiplexed with information of channel identification numbers added to the frames, and the multiplexed frames are transmitted to a multiplexed signal transmission line 04. The transmission memories 22 and 23 respectively needs a capacity of at least 12144 (=1518×8) bits. In the case of 2 channels, the transmission memories are required to have a total capacity of at least 24288 (=12144×2) bits. In a case of n channels, a total capacity of transmission memories should be at least 12144×n bits.

On the other hand, in the demultiplexer 30 of a multiplexed signal transmitter/receiver to be used for a multiplexing transmission of 2-channel Gigabit Ethernet, as shown in FIG. 3, there are frames multiplexed by a multiplexing transmission processor of a Gigabit Ethernet multiplexed signal transmitter/receiver of the same constitution as described, with channel identification numbers added, and received from the transmission means 03 at a demultiplexing processor 31, where the frames with the channel identification numbers are deprived of information of the identification numbers, to be transferred to corresponding channels 1 and 2 of Gigabit Ethernet.

Like this, conventionally, transmission data of Gigabit Ethernet have been electrically multiplexed to be transmitted and received by a Gigabit Ethernet multiplexed signal transmitter/receiver using the method called "frame multiplexing".

However, the multiplexed signal transmitter/receiver using the conventional technique has the following problems.

At the multiplexer of the multiplexed signal transmitter/receiver, where arriving frames at respective channels of Gigabit Ethernet are once stored the transmission memories of the channels before transfer of the stored frames to the multiplexing transmission processor, there is needed every channel a great buffer memory for storing a frame.

Moreover, at the multiplexer of the multiplexed signal transmitter/receiver, sent frames from transmission memories to a multiplexing transmission processor are needed to be once received by the multiplexing transmission processor for processing the frames by adding identification numbers of channels, and further at the demultiplexer of the multiplexed signal transmitter/receiver, when a demultiplexing processor has received frames with added channel identification numbers, there are needed complicated processes such as for the demultiplexing processor to take information of identification numbers out of the frames having the added channel identification numbers. Yet further, for a match between channel identification numbers to be ensured at both the multiplexer and demultiplexer, there are needed additional processes such as for re-calculation of a frame check sequence (by error detection code).

In another conventional art as explained "A System for Native Ethernet Optical Transport at 10 Gb/s submitted to 2000 Conference on Optical Fiber Communications", although link performance is qualified with a $2^{31}-1$ pseudo-random bit sequence at 10.000 Gb/s, the multiplexed data stream is a bit-wise multiplexed 8 b/10 b stream. The 8 b/10 b-multiplexed stream has considerably reduced low-frequency content due to restrictions of 8 b/10 b code, which specify no more than 4 sequential identical bits.

Multiplexer interface boards provide an interface to discrete Gigabit Ethernet signals on both the transmit and receive paths. Two such boards are stacked to provide full connectivity for 8 Gigabit Ethernet sources. Clock synchronization and bit-stream identification are the major multiplexer interface board functions. These functions are accomplished by taking advantage of the features of the Gigabit Ethernet standard, specifically the start and end of frame delimiters, and required idle characters between packets.

Clock synchronization is performed through the use of a first-in-first-out buffer. After reception, incoming Gigabit Ethernet packets are deserialized with a commercial serializer/deserializer that also performs clock recovery and word alignment of the incoming packets. The word-parallel data is clocked out in a 20-bit bus at 62.5 MHz. A complex programmable logic device detects the start and end of a given packet. The logic device places valid packets into the buffer. Another logic device monitoring the 10-bit-wide buffer output reads this data at a synchronous system clock rate of 125 MHz. When packets are not available, link specific idle characters are generated by this logic device. Data is then serialized for multiplexing with another commercial serializer/deserializer.

However, in one-bit-wise multiplexing, there is a great chance for greater run length. In case of 8 channel multiplexing, run length (sequential identical bits) can be as long as 32 bits as the longest run length of a single channel is 4 bits as specified by 8 b/10 b code. The greater run length, such as 32 bits, can cause greater chance of receive error as there is no signal level change for the 32 bits time. In the document referred above, some frame losses caused by receive error are reported and these losses may have been caused by the longer run length of the multiplexed signal.

However, a great run length provides a great transmission error. An idle code of transmission signal needs a replacement with a special code for channel identification. This replacement fails to hold a running disparity of 10-bit code in each channel.

SUMMARY OF THE INVENTION

It therefore is an object of the present invention to solve the problems described.

More specifically, it is an object of the invention to provide a multiplexed signal transmitter and/or receiver and a multiplexing transmission method, without needing such a great buffer memory as necessary for the frame multiplexing system, nor processes for adding channel identification numbers to frames when multiplexing transmission signals or for removal thereof.

It also is an object of the invention to provide a communication system adapted for Gigabit Ethernet multiplexed signal transmission and/or reception employing a relatively small run length, in free of replacement of an idle code of transmission signal.

To achieve the object, according to an aspect of the invention, there is provided a multiplexed signal transmitter comprising input interfaces of which an arbitrary one is provided for a respective channel of Gigabit Ethernet to receive a data from the channel of Gigabit Ethernet, transmission memories for storing data sent from the input interfaces, a transmission selector for alternately reading stored data in the transmission memories at a speed, and a transmission interface for outputting data alternately read by the transmission selector to transmission means, wherein input transmission signals from a plurality of channels of Gigabit Ethernet are multiplexed to be sent to the transmission means, wherein data selectors are provided between the input interfaces and the transmission memories, and connected to a 10-bit data generator for sending to the data selectors particular 10-bit data of which an arbitrary one is predetermined for the respective channel of Gigabit Ethernet, the input interfaces send data in a 10-bit data format via the data selectors to the transmission memories, and the data selectors are adapted, before the input interfaces receive data from the channels of Gigabit Ethernet, to have changed paths for receiving the particular 10-bit data sent from the 10-bit data generator so that they can be sent to the transmission memories, and after the input interfaces have received data from the channels of Gigabit Ethernet, to have changed paths so that data sent from the input interfaces can be sent to the transmission memories.

According to this aspect of the invention, because a multiplexing is not made of frames themselves like the conventional art, but of 10-bit data words of 10 bits, there is not needed a process for once receiving frames to add identification numbers of channels to the frames. Moreover, there are not necessitated processes such as for recalculation of a frame check sequence (by error detection code). Further, by providing every channel with a memory of at least 10 bits, there can be implemented a multiplexing of transmission signals, without needing such a great buffer memory as for a frame multiplexing in the conventional art.

In Gigabit Ethernet, in which combinations of 10-bit data words called "idles" are continuously transmitted even while no frames are transmitted, 10-bit data words of transmission data arrive at respective channels without interruption. Accordingly, arriving 10-bit data at the channels can be alternately sent to a multiplexing channel to thereby implement a multiplexing.

Further, to achieve the object, according to another aspect of the invention, there is provided a multiplexed signal receiver comprising a reception interface for receiving a multiplexed data signal from transmission means, a reception memory for storing data received by the reception interface, and output interfaces for outputting data from the reception memory to respective channels of Gigabit Ethernet, as they are demultiplexed thereto, wherein a channeler is connected between the reception memory and the output interfaces, and provided with a decision maker for sending to the channeler a control signal based on data of the reception memory, the reception interface receives via the transmission means a 10-bit data signal multiplexed by a multiplexed signal transmitter, the decision maker is adapted to make a decision on whether or not a particular 10-bit data pattern is contained in data of the reception memory, and when the particular 10-bit data pattern is contained in the data of the reception memory, to send the control signal for the channeler to send the data to a particular output interface, and the channeler is responsible for the control signal received from the decision maker to send 10-bit data to the output interfaces, alternately per 10 bits.

According to this aspect of the invention, there can be eliminated complicated processes such as for removing information of identification numbers from frames, as well as processes such as for re-calculation of a frame check sequence (by error detection code).

According to still another aspect of the invention, there is provided a multiplexing transmission method, wherein at a multiplexed signal transmitter in which data signals input from a plurality of channels of Gigabit Ethernet are multiplexed to be transmitted, a particular 10-bit data word is transmitted before transmission of a data input from a particular channel, and at a multiplexed signal receiver, the particular channel is identified by the 10-bit data word to be present or not.

According to this aspect of the invention, by sending a pattern of particular 10-bit data to a particular channel before a normal multiplexing transmission, it is allowed at the reception end to identify a transmission signal of a respective channel of Gigabit Ethernet from a multiplexed transmission signal, without needing processes such as for adding channel identification numbers to frames when multiplexing nor for removal thereof.

Further, to achieve the object, according to yet another aspect of the invention, there is provided a communication system for Gigabit Ethernet, comprising a first input interface for inputting a first sequence of 10-bit data from a first channel, a second input interface for inputting a second sequence of 10-bit data from a second channel, a 10-bit data generator for generating a third sequence of 10-bit data including a particular 10-bit data, and a data selector for selecting a sequence of first 10-bit data of the first sequence of 10-bit data, a sequence of second 10-bit data of the second sequence of 10-bit data, and the particular 10-bit data interposed between the sequence of first 10-bit data and the sequence of second 10-bit to define a channel change between the first and second channels.

According to this aspect of the invention, channel identification can be effected by interposition of a particular 10-bit data, without need of an embedded identifier.

Also, according to this aspect of the invention, the run length (sequential identical bits) can be limited to 8 bits or less as the longest run length of a single channel is 4 bits as specified by 8b/10 b code.

BRIEF DESCRIPTION OF THE
ACCOMPANYING DRAWINGS

DETAILED DESCRIPTION OF THE
PREFERRED EMBODIMENTS

There will be described below a multiplexed signal transmitter/receiver adapted for a multiplexed signal transmission of 2-channel Gigabit Ethernet, as a first preferred embodiment of a multiplexed signal transmitter and a multiplexed signal receiver according to the present invention.

Figure 1:
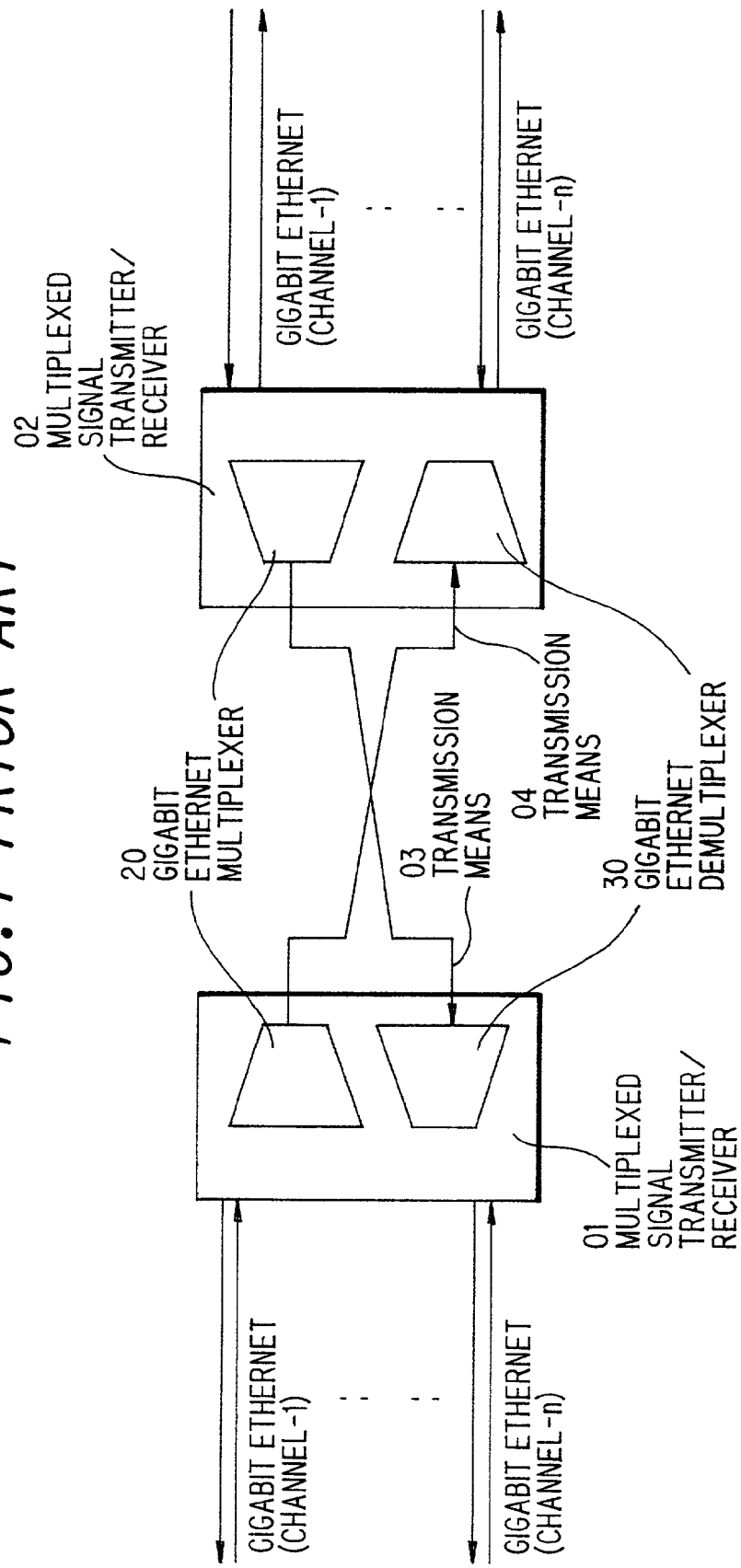
FIG. 1 is a diagram schematically showing a conventional multiplexed signal transmitter/receiver.
Figure 2:
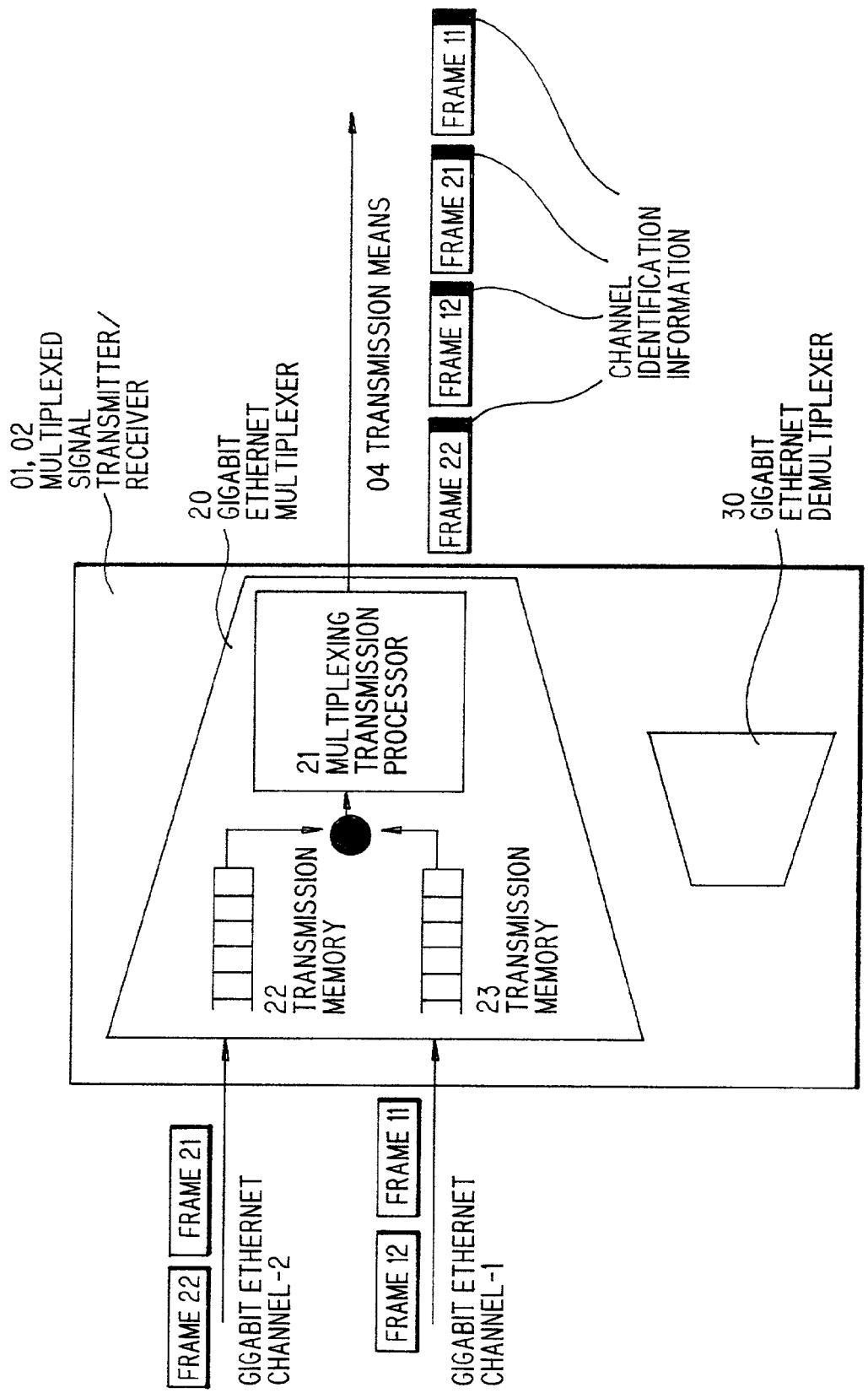
FIG. 2 is a diagram describing a Gigabit Ethernet multiplexer 20 of the conventional multiplexed signal transmitter/receiver.
Figure 3:
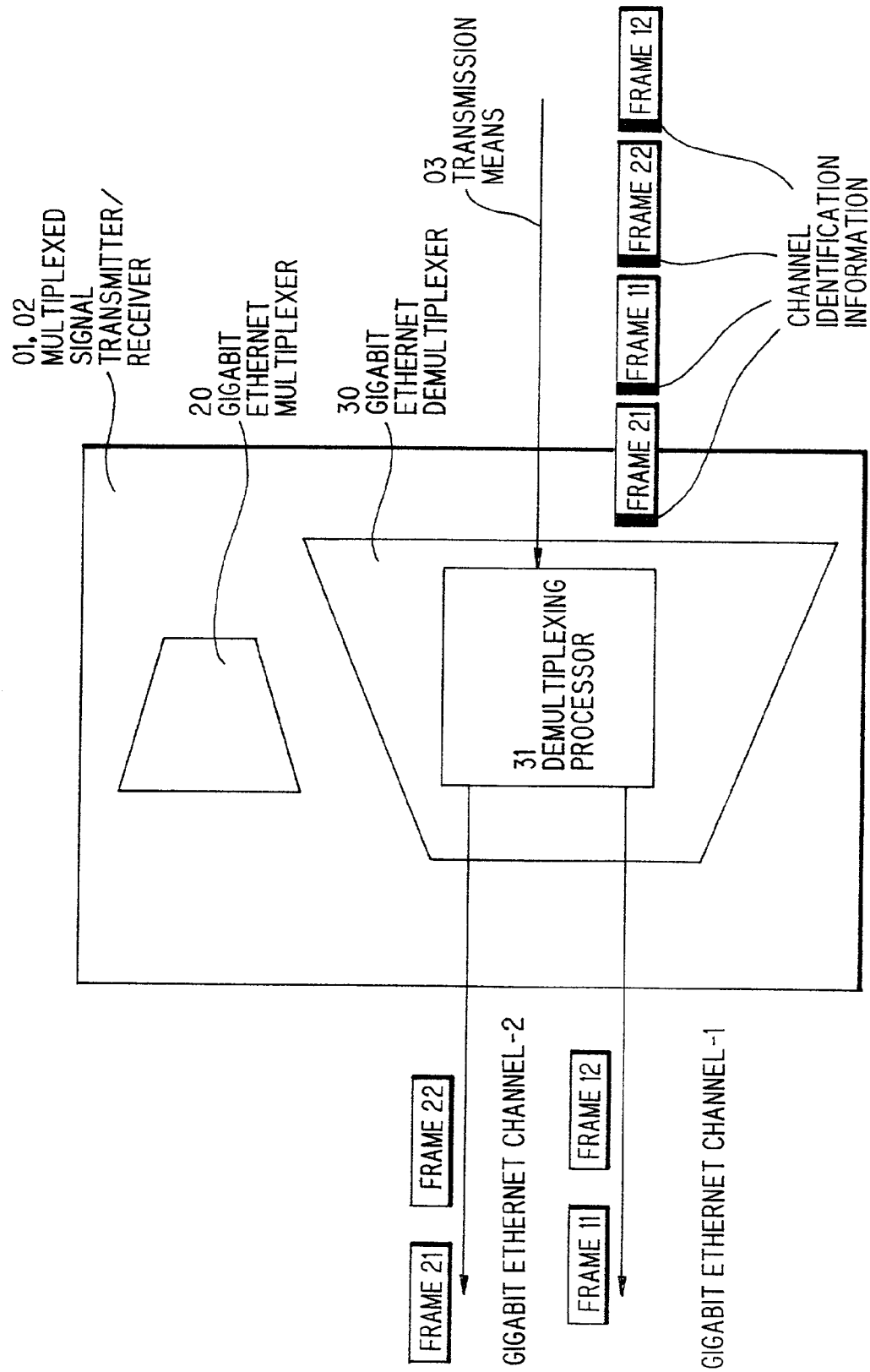
FIG. 3 is a diagram describing a Gigabit Ethernet demultiplexer 30 of the conventional multiplexed signal transmitter/receiver.
Figure 4:
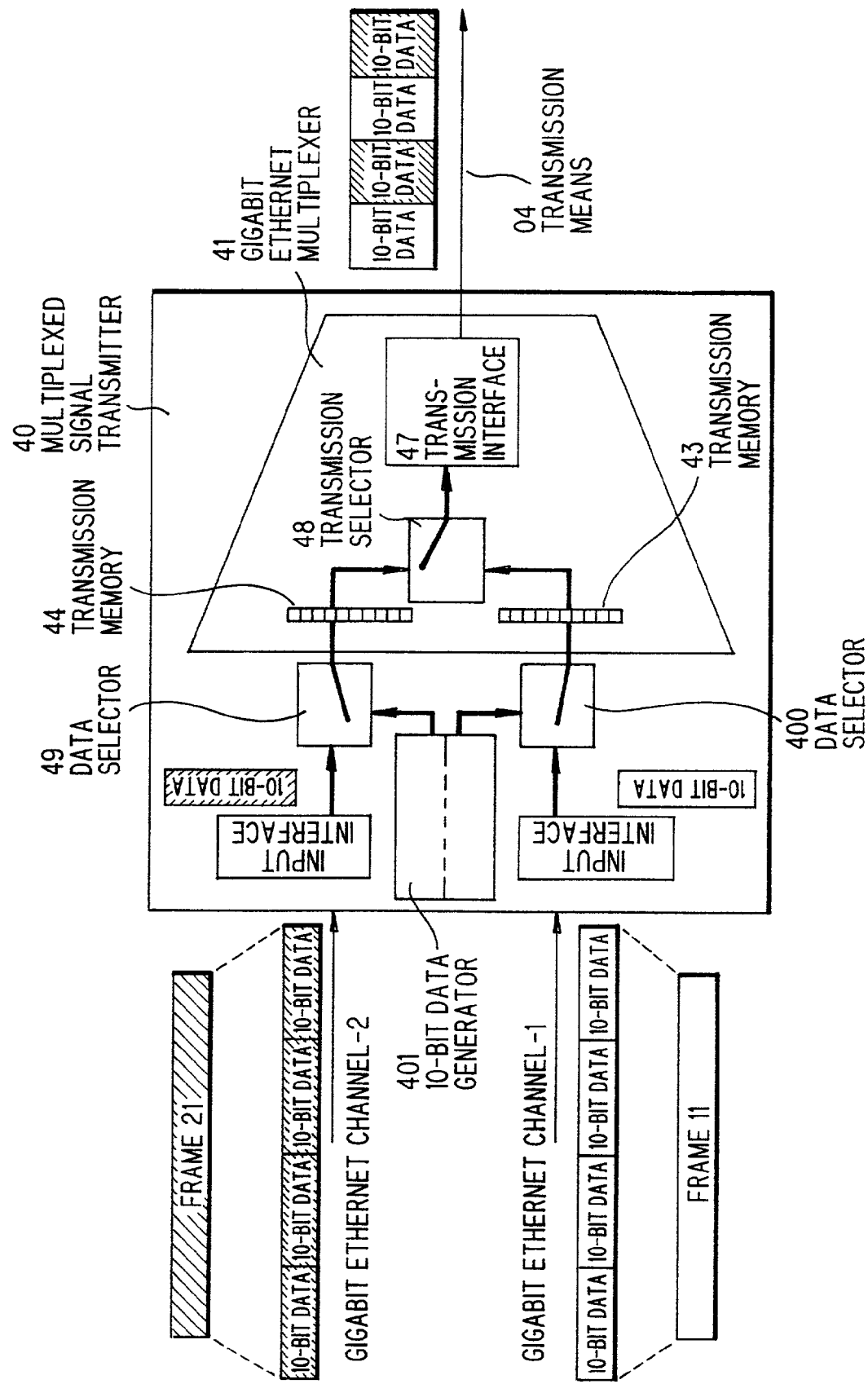
FIG. 4 is a diagram describing a Gigabit Ethernet multiplexer 41 of a multiplexed signal transmitter/receiver according to the invention.
Figure 5:
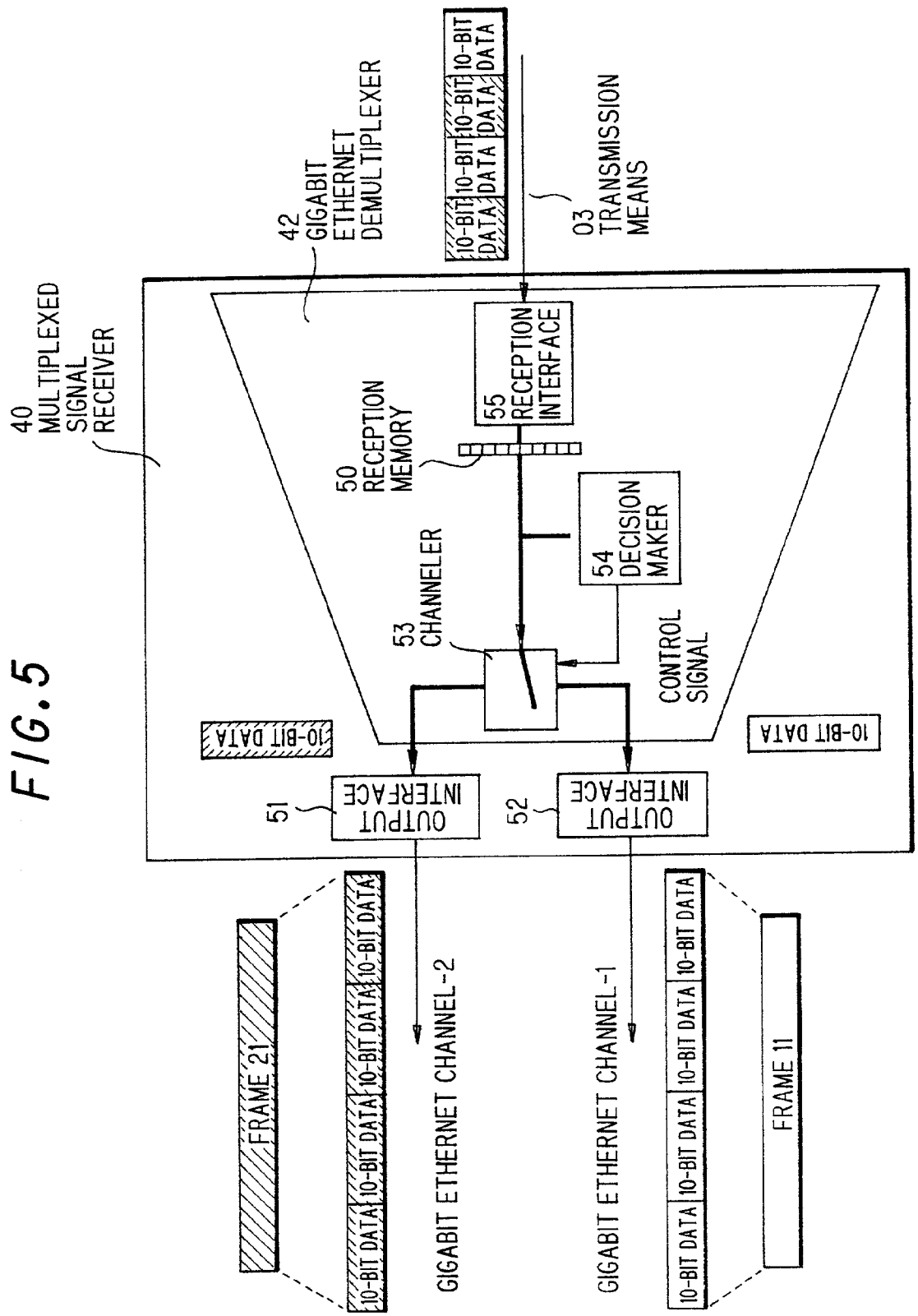
FIG. 5 is a diagram describing a Gigabit Ethernet demultiplexer 42 of the multiplexed signal transmitter/receiver according to the invention.
Figure 6:
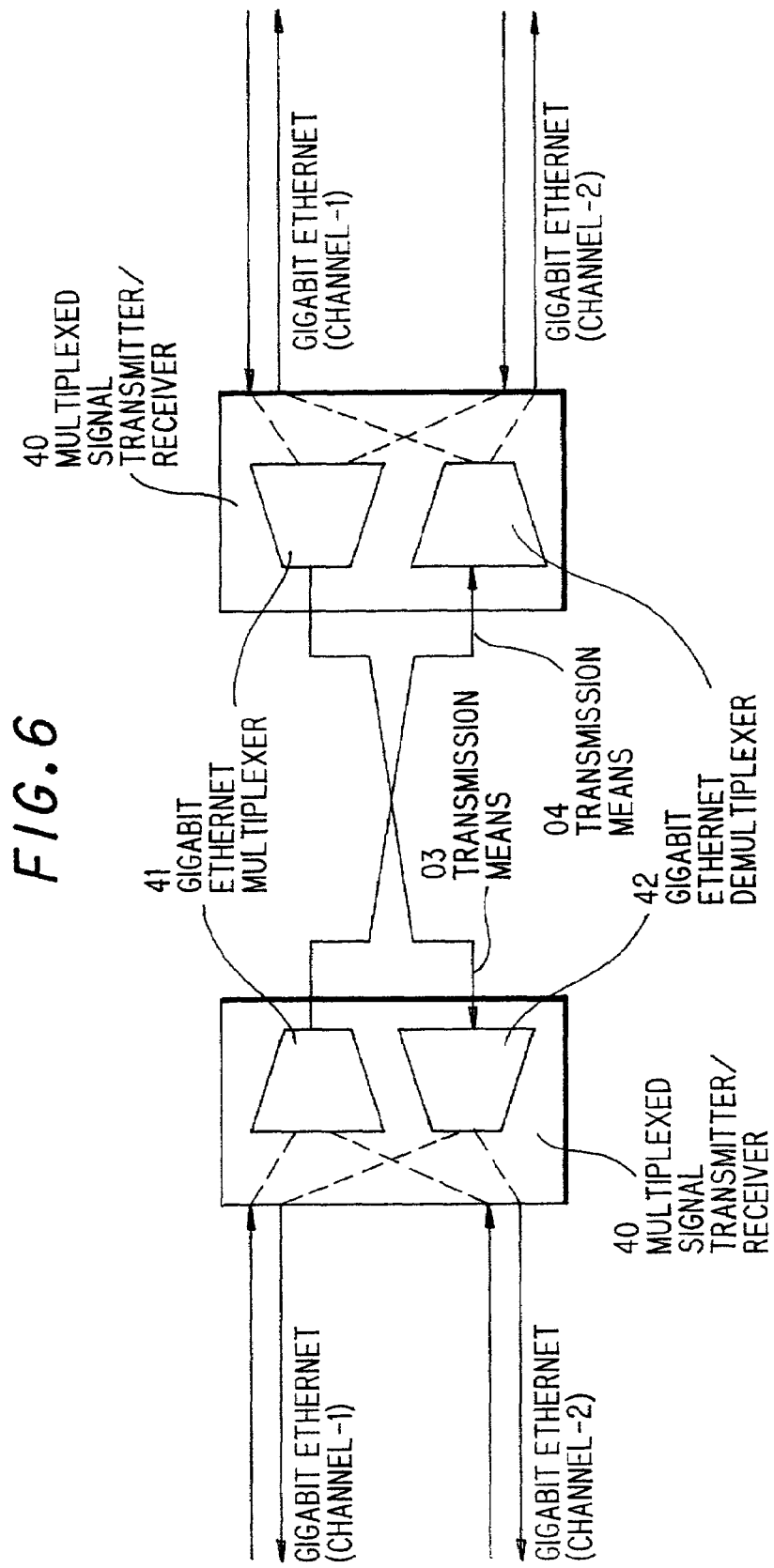
FIG. 6 is a diagram showing connection for a multiplexing transmission using the multiplexed signal transmitter/receiver according to the invention.

The multiplexed signal transmitter/receiver is arranged as a single apparatus having combined what is at the transmission end shown in FIG. 4 including a Gigabit Ethernet multiplexer 41, and what is at the reception end shown in FIG. 5 including a Gigabit Ethernet demultiplexer 42. To implement a multiplexing transmission by this apparatus, two multiplexed signal transmitter/receivers are connected to each other by a pair of transmission means, preferably by a pair of optical fiber cables, as shown in FIG. 6, whereby this transmission/reception apparatus is adapted for bi-directional transmission.

As shown in FIG. 4, the arrangement at the transmission end is constituted with input interfaces 45 and 46, a 10-bit data generator 401, data selectors 49 and 400 adapted, before commencement of communications via transmission means with the opponent multiplexed signal transmitter/receiver, to have changes paths so that 10-bit data from the 10-bit data generator 401 can be selected at least once, and thereafter, to have changed paths for selecting data from the input interfaces 45 and 46 without interruption, and a Gigabit Ethernet multiplexer 41 including a transmission memory 44, another transmission memory 43, a transmission selector 48, and a transmission interface 47.

As shown in FIG. 5, at the reception end, the arrangement is constituted with a Gigabit Ethernet demultiplexer 42 including a reception interface 55, a reception memory 50, a decision maker 54, and a channeler 53, and output interfaces 51 and 52.

The multiplexed signal transmitter/receivers function at the transmission end and the reception end, as follows.

At the transmission end, at first, particular 10-bit data which are predetermined by channels of Gigabit Ethernet are sent from the 10-bit data generator 401 to the data selectors. Before commencement of communications via transmission means with the opponent multiplexed signal transmitter/receiver, the particular 10-bit data sent from the 10-bit data generator 401 are selected at least once by the data selectors 49 and 400, respectively, whereby the paths are changed over. Thereafter, sent data from the input interfaces 45 and 46 are selected by the data selectors 49 and 400, without interruption, whereby the paths are changed over.

When starting communications via transmission means with the opponent multiplexed signal transmitter/receiver, as shown in FIG. 4, the input interface 46, or 44 vice versa, receives, from Gigabit Ethernet channel-1, or channel-2, transmission data of the channel in the form of a frame, one bit after one bit. Each time when the data of one bit is collected up to 10 bits, the input interface 46 or 45 converts them in a format of 10-bit data, and sends the 10-bit data by an internal bus with a bus width of 10 bits, via the data selector 400 or 49, to the transmission memory 43 for the channel-1 or the transmission memory 44 for the channel-2, where it is written. The transmission memory 43 or 44 has a capacity of 10 bits or more, and holds a written 10-bit data until a subsequent 10-bit data is written. The transmission selector 48 reads a 10-bit data alternately from the transmission memories 43 and 44, at a rate equivalent to or faster than twice the rate by which a 10-bit data is written to the transmission memory 43 or 44, and sends it to the transmission interface 47. At the transmission interface 47, received 10-bit data are transmitted to the transmission means 04, one bit after one bit, at a double rate of a transmission rate of Gigabit Ethernet. via the transmission selector 48 and the transmission interface 47 onto a channel-1 of the transmission means 04.

On the other hand, at the reception end, there are received data which are multiplexed by the same means as the above-noted transmission end in an opponent multiplexed signal transmitter/receiver and sent via transmission means 03. The opponent multiplexed signal transmitter/receiver is identical in constitution to the multiplexed signal transmitter/receiver according to this embodiment. More specifically, first, the reception interface 55 receives the multiplexed data from the transmission means 03, one bit after one bit, at a double rate of Gigabit Ethernet. Each time when this data of one bit is collected up to 10 bits, the reception interface 55 converts them in a format of 10-bit data, and writes the 10-bit data to the reception memory 50, by an internal bus with a bus width of 10 bits. Then, the decision maker 54 decides whether or not a pattern of particular 10-bit data is contained in a written data in the reception memory 50. As a result of decision by the decision maker 54, if the pattern of 10-bit data is contained, the decision maker 54 issues a control signal to the channeler 53 so that the data containing the pattern of particular 10-bit data is sent to the output interface 51 or 52 of a particular Gigabit Ethernet channel. Given the control signal, the channeler 53 sends a 10-bit data alternately to the output interface 51 and 52, each time when the 10-bit data is written in the reception memory 50. The output interface 51, or 52 vice versa, handles the 10-bit data allotted thereto by the channeler 53, one bit after one bit, to be transferred at the same rate as the transmission rate of Gigabit Ethernet, in the form of a frame, to channel-2, or channel-1.

There will be described, with reference to FIG. 7 and FIG. 8, a second preferred embodiment of the invention in which the following startup processes are performed prior to a normal data transmission.

Figure 7:
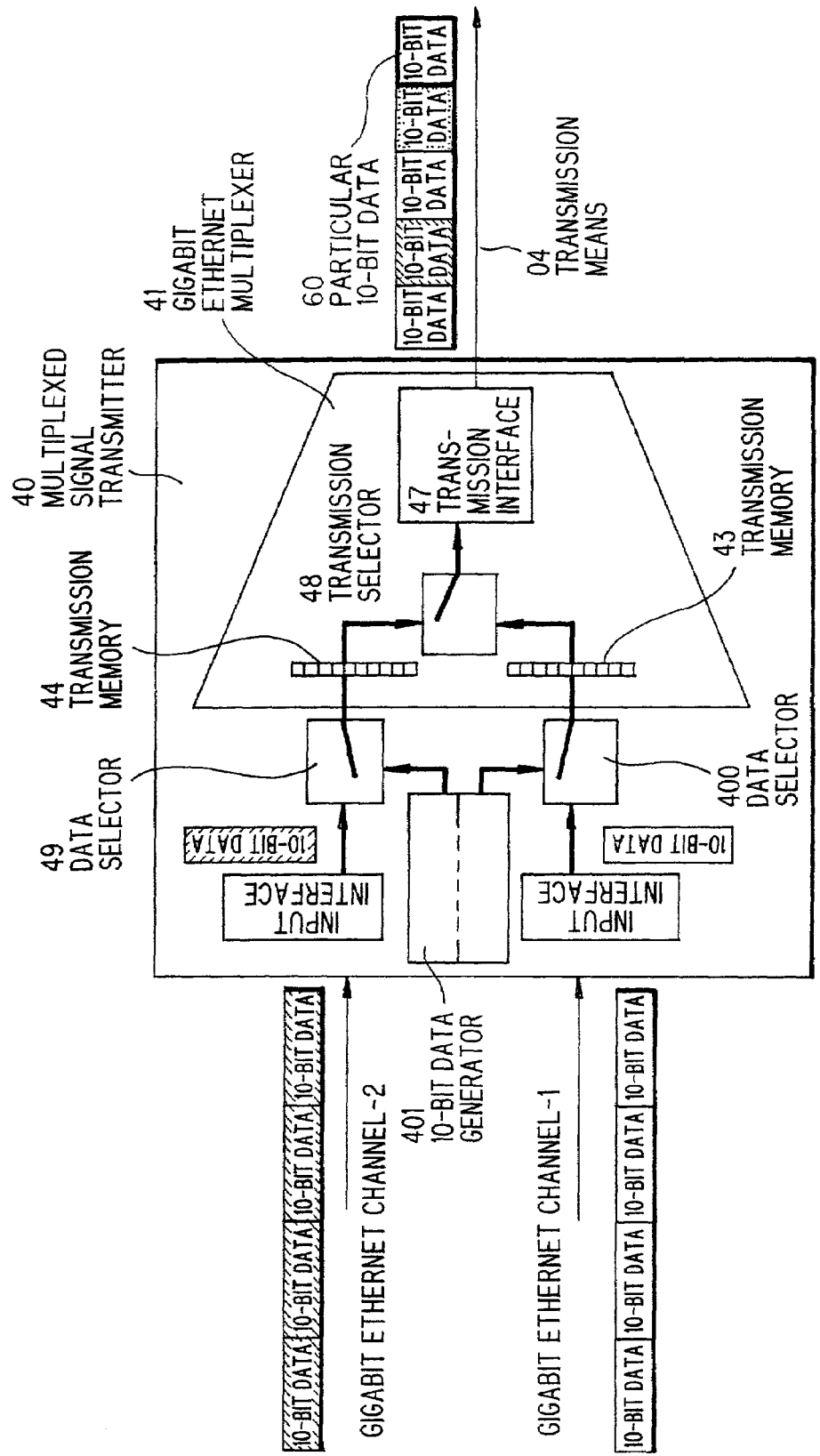
FIG. 7 is a diagram showing processes at a transmission end of a multiplexed signal transmitter/receiver according to the invention.

FIG. 7 shows a transmission end of a multiplexed signal transmitter/receiver according to the embodiment. In a process for a channel-1, a 10-bit data generator 401 alternately sends a K28.5 special code (of a bit sequence '0-0-1-1-1-1-1-0-1-0' or '1-1-0-0-0-0-0-1-0-1') and a D0.0 data code (of a bit sequence '1-0-0-1-1-1-0-1-0-0' or '0-1-1-0-0-0-1-0-1-0-1-1'), as a 10-bit data to a data selector 400. The data selector 400 selects the data sent from the 10-bit data generator 401, to write in a transmission memory 43 for the channel-1. This data is transmitted via a transmission selector 48 and a transmission interface 47 to transmission means 04. It is noted that the K28.5 special code contains a comma sequence (as a bit sequence '0-0-1-1-1-1-1' or '1-1-0-0-0-0-0'), which is guaranteed by a code rule so as not to occur astride a word boundary in sequence of 10-bit data words of Gigabit Ethernet.

On the other hand, in a process for a channel-2, the 10-bit data generator 401 continuously sends to a data selector 49 some data code, for example the DO.0 data code (of a bit sequence '1-0-0-1-1-1-0-1-0-0' or '0-1-1-0-0-0-1-0-1-1'), alternately sending the K28.5 special code and the D0.0 data code to the data selector 400 in the process for the channel-1. The data selector 49 selects any data other than the K28.5 special code sent from the 10-bit data generator 401, to write in a transmission memory 44 for the channel-2. This data is sent via the transmission selector 48 and the transmission interface 47 onto a channel-1 of the transmission means 04.

Figure 8:
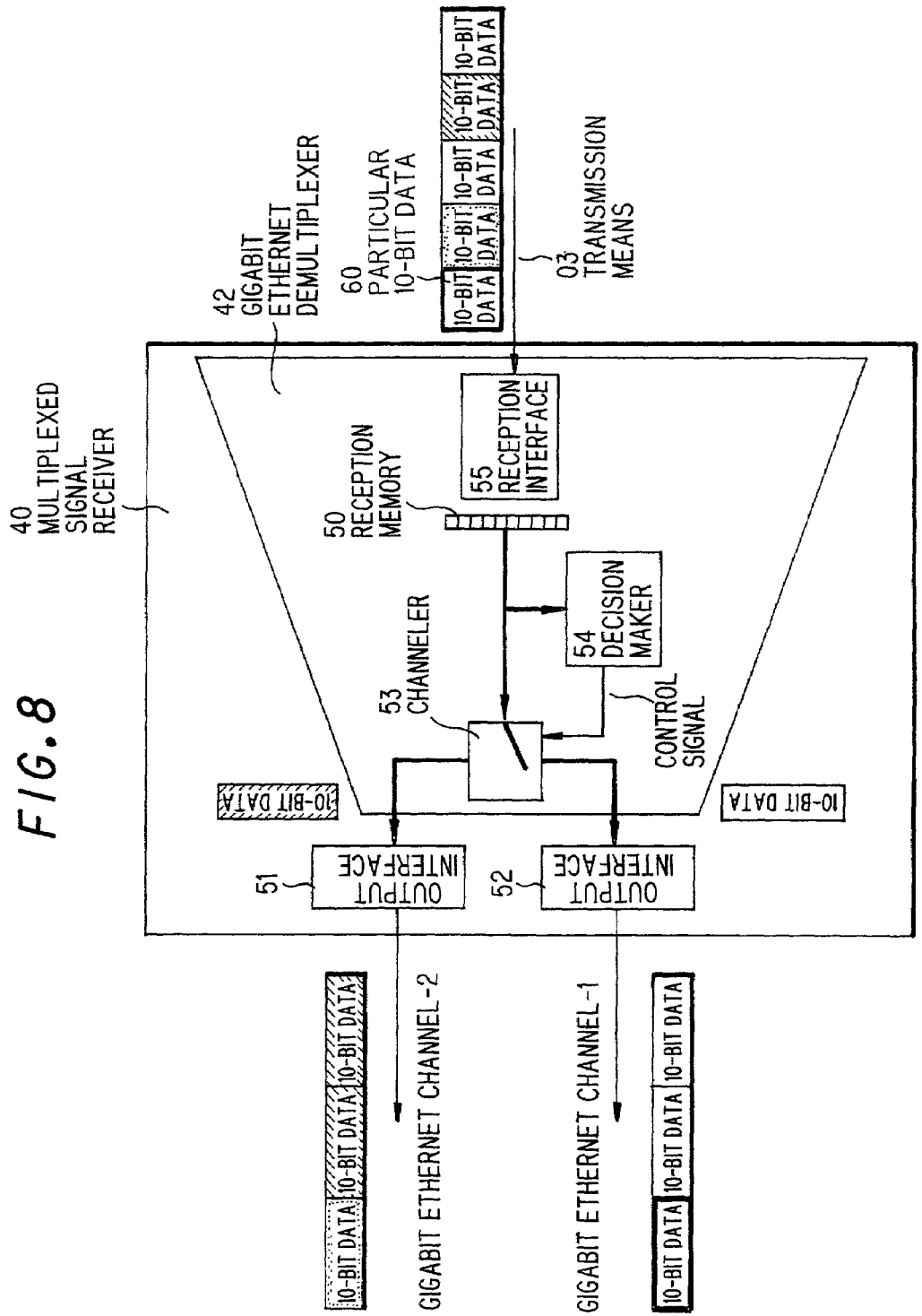
FIG. 8 is a diagram showing processes at a reception end of the multiplexed signal transmitter/receiver according to the invention.

Next, as shown in FIG. 8, in processes at a reception end of a multiplexed signal transmitter/receiver according to the invention, first, a decision maker 54 waits an arrival of the K28.5 special code from a transmission means. The K28.5 special code can be detected by checking for a comma sequence contained in a bit sequence. Upon detection of a comma sequence, the decision maker 54 is allowed for and makes a decision that a K28.5 special code on a channel-1 sent by a multiplexed signal transmitter/receiver corresponding to an opponent station has arrived, employing this as a reference for data in a reception memory 50 to be set to a 10-bit boundary. Thereby, word alignment (code boundary detection) of 10-bit data is implemented. Further, it is possible to decide a 10-bit data subsequent to the K28.5 special code to be a transfer data of the channel-1, and a subsequent 10-bit data to be a transfer data of a channel-2. Thereby, the decision maker 54 controls a channeler 53 to send a data to a channel-1 if the data is a K28.5 special code, and thereafter, by 10 bits after 10 bits, alternately to a channel-2, to the channel-1, to the channel-2, . . . , thereby allowing for channel identification of arriving signals.

The K28.5 special code may be consecutively transmitted at the transmission end, so that even when an initial part of a transmission signal is failed at the reception end, the channel can be identified by a K28.5 special code next to arrive, allowing for an ensured channel identification.

Upon completion of channel identification of transfer data by the foregoing processes, a Gigabit Ethernet multiplexer 41 alternately transmits to the channel-1 a K28.5 special code and a D0.1 data code (of a bit sequence '0-1-1-1-0-1-0-1-0-0' or '1-0-0-0-1-0-1-0-1-1') as an 8-bit data of which '1' is changed to a 10-bit data.

A Gigabit Ethernet demultiplexer 42 is thus allowed to judge an opponent station to have completed reception data's word alignment and channel identification, from alternate arrivals of the K28.5 special code and the D0.1 data code on the channel-1.

After the completion of reception data's word alignment and channel identification and the reception of K28.5 special code and D0.1 data code on the channel-1, it is possible to conclude that reception data's word alignment and channel identification have been completed at both ends, whereby the startup processes are completed, allowing for the normal data transmission and reception to start.

In the embodiment above, description for the transmission end is made of the case in which the K28.5 special code and the D0.0 data code are alternately transmitted on the channel-1 of transmission means 04 when starting the startup process. However, the D0.0 data code may be replaced by another data code subject to possible distinction from the case when finishing the startup process. Moreover, the K28.5 special code is not always needed to be transmitted alternately with other data code, and may well be transmitted periodically, or irregularly a plurality of times. Likewise, when finishing the startup process, the D0.1 data code may be replaced by another data code subject to possible distinction from the case when starting the startup process, and the K28.5 special code is not always needed to be transmitted alternately with other data code, and may well be transmitted periodically, or irregularly a plurality of times.

Although in the foregoing embodiments the present invention is applied to Gigabit Ethernet, the invention is applicable also to a Fiber Channel specified in the NCITS (National Committee for Information Technology Standardization) T11 of the ANSI (American National Standard Institute) standards, in which an analogous 10-bit data to Gigabit Ethernet is employed.

As will be seen from the foregoing embodiments, according to the invention, there can be achieved excellent advantages, as follows:

According to an aspect of the invention, because a multiplexing is made of 10-bit data of 10 bits, by providing every channel with a memory of at least 10 bits, there can be implemented a multiplexing of transmission signals, without needing such a great buffer memory as for a frame multiplexing in the conventional art. Moreover, there is not needed a process for once receiving frames to add identification numbers of channels to the frames. Further, there are not necessitated processes such as for re-calculation of a frame check sequence (by error detection code).

According to another aspect of the invention, even in reception of frames having no channel identification numbers added, the data can be demultiplexed for transmission to a plurality of Gigabit Ethernet channels, there can be eliminated complicated processes such as for removing information of identification numbers from frames.

There can be eliminated processes such as for re-calculation of a frame check sequence (by error detection code), as well.

According to still another aspect of the invention, by sending a pattern of particular 10-bit data to a particular channel before a normal multiplexing transmission, it is allowed at the reception end to identify a transmission signal of a respective channel of Gigabit Ethernet from a multiplexed transmission signal, without needing processes such as for adding channel identification numbers to frames when multiplexing nor for removal thereof.

According to yet another aspect of the invention, a data selector selects a sequence of first 10-bit data, a sequence of second 10-bit, and a particular 10-bit data interposed between the sequence of first 10-bit data and the sequence of second 10-bit to define a channel change between the first and second channels. Accordingly, channel identification can be effected by interposition of a particular 10-bit data in a facilitated manner, without need of an embedded identifier, and with a small buffer capacity.

Therefore, according to the invention, there can be provided a new multiplexed signal transmitter/receiver without needing such a great buffer memory as in the frame multiplexing system, or processes such as for adding channel identification numbers to frames when multiplexing nor for removal thereof.

What is claimed is:

1. A multiplexed signal transmitter comprising:
   input interfaces of which an arbitrary one is provided for a respective channel of Gigabit Ethernet to receive a data from the channel of Gigabit Ethernet;
   transmission memories for storing data sent from the input interfaces;
   a transmission selector for alternately reading stored data in the transmission memories at a speed; and
   a transmission interface for outputting data alternately read by the transmission selector to a transmission line, wherein input transmission signals from a plurality of channels of Gigabit Ethernet are multiplexed to be sent to the transmission line,
   wherein data selectors are provided between the input interfaces and the transmission memories, and connected to a 10-bit data generator for sending to the data selectors particular 10-bit data of which an arbitrary one is predetermined for the respective channel of Gigabit Ethernet,
   the input interfaces send data in a 10-bit data format via the data selectors to the transmission memories, and
   the data selectors are adapted, before the input interfaces receive data from the channels of Gigabit Ethernet, to have changed paths for receiving the particular 10-bit data sent from the 10-bit data generator so that they can be sent to the transmission memories, and after the input interfaces have received data from the channels of Gigabit Ethernet, to have changed paths so that data sent from the input interfaces can be sent to the transmission memories.

2. A multiplexed signal transmitter according to claim 1, wherein the particular 10-bit data comprises a special code comprising a bit sequence containing a comma sequence.

3. A multiplexed signal receiver comprising:
   a reception interface for receiving a multiplexed data signal from a transmission line;
   a reception memory for storing data received by the reception interface; and
   output interfaces for outputting data from the reception memory to respective channels of Gigabit Ethernet, as they are demultiplexed thereto,
   wherein a channeler is connected between the reception memory and the output interfaces, and provided with a decision maker for sending to the channeler a control signal based on data of the reception memory,
   the reception interface receives via the transmission line a 10-bit data signal multiplexed by a multiplexed signal transmitter according to claim 1,
   the decision maker is adapted to make a decision on whether or not a particular 10-bit data pattern is contained in data of the reception memory, and when the particular 10-bit data pattern is contained in the data of the reception memory, to send the control signal for the channeler to send the data to a particular output interface, and
   the channeler is responsible for the control signal received from the decision maker to send 10-bit data to the output interfaces, alternately per 10bits.

4. A multiplexed signal receiver according to claim 3, wherein the particular 10-bit data pattern comprises a special code comprising a bit sequence containing a comma sequence.

* * * * *